United States Patent
Jung et al.

(10) Patent No.: US 12,333,334 B2
(45) Date of Patent: Jun. 17, 2025

(54) METHOD FOR MONITORING JOB SCHEDULER, APPARATUS AND SYSTEM FOR EXECUTING THE METHOD

(71) Applicant: SAMSUNG SDS CO., LTD, Seoul (KR)

(72) Inventors: Young Hoon Jung, Seoul (KR); Se Jun Kim, Seoul (KR); Da Seul Bae, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 505 days.

(21) Appl. No.: 17/972,738

(22) Filed: Oct. 25, 2022

(65) Prior Publication Data
US 2023/0129998 A1    Apr. 27, 2023

(30) Foreign Application Priority Data
Oct. 26, 2021   (KR) .......................... 10-2021-0143756

(51) Int. Cl.
*G06F 9/48*        (2006.01)
(52) U.S. Cl.
CPC ............ *G06F 9/4881* (2013.01); *G06F 9/485* (2013.01)
(58) Field of Classification Search
None
See application file for complete search history.

(56) References Cited

U.S. PATENT DOCUMENTS

| | | | | |
|---|---|---|---|---|
| 7,099,799 | B2 * | 8/2006 | Huard | G06F 11/3447 |
| | | | | 702/186 |
| 7,761,875 | B2 * | 7/2010 | Karamanolis | G06F 9/50 |
| | | | | 370/235 |
| 9,170,843 | B2 * | 10/2015 | Glew | G06F 9/5011 |
| 9,417,912 | B2 * | 8/2016 | Suh | G06F 9/4887 |
| 10,452,449 | B1 * | 10/2019 | Verplaetse | G06F 9/5044 |
| 11,182,695 | B1 * | 11/2021 | Kirsche | G06N 3/088 |
| 11,934,870 | B2 * | 3/2024 | Seroul | G06N 20/00 |
| 12,056,525 | B2 * | 8/2024 | Morris | G06F 9/48 |
| 12,099,884 | B2 * | 9/2024 | An | G06F 9/505 |
| 12,164,959 | B2 * | 12/2024 | Youn | G06F 9/4887 |

FOREIGN PATENT DOCUMENTS

KR    10-2012-0082598 A    7/2012

* cited by examiner

*Primary Examiner* — Van H Nguyen
(74) *Attorney, Agent, or Firm* — Sughrue Mion, PLLC

(57) ABSTRACT

A method for monitoring a job scheduler may be performed on a computing device including one or more processors and a memory storing one or more programs executed by the one or more processors. The method may include checking whether it is necessary to determine whether to expand a resource of a computing environment to be scheduled when a job is performed by scheduling by a job scheduler; calculating a value of a score function for a scheduling policy currently executing and a maximum value of a predetermined score function when it is necessary to determine whether to expand a resource of the computing environment to be scheduled; and determining to expand a resource of the computing environment to be scheduled based on the value of the score function and the maximum value of the predetermined score function.

16 Claims, 7 Drawing Sheets

METHOD FOR MONITORING JOB SCHEDULER, APPARATUS AND SYSTEM FOR EXECUTING THE METHOD

CROSS-REFERENCE TO RELATED APPLICATION AND CLAIM OF PRIORITY

This application claims the benefit under 35 USC § 119 of Korean Patent Application No. 10-2021-0143756, filed on Oct. 26, 2021 in the Korean Intellectual Property Office, the disclosure of which is incorporated herein by reference in its entirety.

BACKGROUND

1. Field

Example embodiments of the present disclosure relate to a technique of monitoring a job scheduler.

2. Description of Related Art

To efficiently utilize scarce resources such as a graphics processing unit (GPU) in a cloud computing environment, the role of a job scheduler may be important. Recently, an artificial intelligence (AI)-based job scheduler has appeared to address the issues related to job scheduling.

However, differently from the heuristic-based traditional job scheduler in which a scheduling policy does not change, a scheduling policy of the artificial intelligence-based job scheduler may continuously change through learning, such that, it may be necessary to monitor performance thereof when an actual job scheduler is operated. That is, since the newly learned artificial intelligence-based job scheduler is specialized for learning data, it is necessary to, by evaluating performance of the learned job scheduler before actually applying the job scheduler, determine whether to update the job scheduler.

Also, when a resource is insufficient in the cloud computing environment, it may be difficult to improve performance of the artificial intelligence-based job scheduler no matter how much learning is conducted. Accordingly, a measure for determining whether the resource is insufficient and expanding the resource may be necessary.

SUMMARY

Example embodiments of the present disclosure provide a method for monitoring a job scheduler which may monitor performance of an artificial intelligence (AI)-based job scheduler, and an apparatus and a system for executing the method.

Example embodiments of the present disclosure provide a method for monitoring a job scheduler which may determine whether to expand a resource of a computing environment to be scheduled, and an apparatus and a system for executing the method.

According to an example embodiment of the present disclosure, a method for monitoring a job scheduler, performed on a computing device including one or more processors and a memory storing one or more programs executed by the one or more processors includes checking whether it is necessary to determine whether to expand a resource of a computing environment to be scheduled when a job is performed by scheduling by a job scheduler; calculating a value of a score function for a scheduling policy currently executing and a maximum value of a predetermined score function when it is necessary to determine whether to expand a resource of the computing environment to be scheduled; and determining to expand a resource of the computing environment to be scheduled based on the value of the score function and the maximum value of the predetermined score function.

The checking whether it is necessary to determine whether to expand a resource may include calculating a predetermined reference condition value in the computing environment to be scheduled; checking whether the reference condition value exceeds a predetermined threshold value; and determining that it is necessary to determine whether to expand a resource of the computing environment to be scheduled, when the reference condition value exceeds the predetermined threshold value.

The determining to expand a resource may include calculating a difference between the value of the score function and the maximum value of the predetermined score function; checking whether the difference between the value of the score function and the maximum value of the predetermined score function is lower than a predetermined threshold value; and determining that it is necessary to expand a resource the computing environment to be scheduled when the difference between the value of the score function and the maximum value of the predetermined score function is lower than the predetermined threshold value.

The method may further include changing a scheduling policy of the job scheduler when the difference between the value of the score function and the maximum value of the predetermined score function is equal to or higher than the predetermined threshold value.

The calculating the maximum value of the score function may include learning a new scheduling policy of the job scheduler; writing each of values of a cost function calculated in the learning in a list; and estimating a maximum value among the values of the cost function written in the list as a maximum value of the score function for the corresponding scheduling policy.

The calculating the maximum value of the score function may include calculating distribution of probability of workload data from pre-stored workload data; generating arbitrary workload data to follow the calculated distribution of probability; learning a new scheduling policy of the job scheduler based on the generated workload data; writing each of the values of the cost function calculated in the learning in a list; and estimating a maximum value among the values of the cost function written in the list as a maximum value of the score function for the corresponding scheduling policy.

The method may further include learning a scheduling policy of the job scheduler using a predetermined artificial neural network model.

The learning a scheduling policy may include generating learning data based on job-related log information provided in the computing environment to be scheduled; learning the scheduling policy by inputting the learning data into the artificial neural network model; checking whether performance of the job scheduler according to the learned scheduling policy is equal to or greater than performance of the job scheduler according to the previous scheduling policy; and updating the learned scheduling policy to the scheduling policy of the job scheduler when performance of the job scheduler according to the learned scheduling policy is equal to or greater than performance of the job scheduler according to the previous scheduling policy.

The method may further include predicting the amount of resource to be expanded of the computing environment to be scheduled.

The predicting the amount of resource to be expanded may include calculating a value of a score function for a scheduling policy using a resource capacity of a set of predetermined resource capacities; calculating a predetermined reference condition value in the computing environment to be scheduled; checking whether the predetermined reference condition value is equal to or lower than a predetermined threshold value; matching the resource capacity with a value of a score function corresponding to the resource capacity and writing the matching value in a list, when the predetermined reference condition value is equal to or lower than a predetermined threshold value; and extracting a resource capacity at which the value of the score function becomes a maximum value from the list as an optimal value of the resource capacity to be expanded.

According to an example embodiment of the present disclosure, an apparatus for monitoring a job scheduler including a resource expansion determination module includes one or more processors; and a memory storing one or more programs, which are configured to be executed by the one or more processors. The one or more programs include instructions for the resource expansion determination module, which the resource expansion determination module includes a reference condition checking unit configured to check whether it is necessary to determine whether to expand a resource of a computing environment to be scheduled when a job is performed by scheduling by a job scheduler; and a resource expansion determination unit configured to, when it is necessary to determine whether to expand a resource of the computing environment to be scheduled, calculate a value of a score function for a scheduling policy currently executing and a maximum value of a predetermined score function, and to determine to expand a resource of the computing environment to be scheduled based on the value of the score function and the maximum value of the predetermined score function.

The reference condition checking unit may calculate a predetermined reference condition value in the computing environment to be scheduled, and when the reference condition value exceeds a predetermined threshold value, the reference condition checking unit may determine that it is necessary to determine whether to expand a resource of the computing environment to be scheduled.

The resource expansion determination unit may calculate a difference between the value of the score function and the maximum value of the predetermined score function, and when a difference between the value of the score function and the maximum value of the predetermined score function is lower than the predetermined threshold value, the resource expansion determination unit may determine that it is necessary to expand a resource the computing environment to be scheduled.

The resource expansion determination unit may change a scheduling policy of the job scheduler when a difference between the value of the score function and the maximum value of the predetermined score function is equal to or higher than the predetermined threshold value.

The resource expansion determination unit may learn a new scheduling policy of the job scheduler, may write each of values of a cost function calculated in the learning in a list, and may estimate a maximum value among the values of the cost function written in the list as a maximum value of the score function for the corresponding scheduling policy.

The resource expansion determination unit may calculate distribution of probability of workload data from pre-stored workload data, may generate arbitrary workload data to follow the calculated distribution of probability, may learn a new scheduling policy of the job scheduler based on the generated workload data, may write each of the values of the cost function calculated in the learning in a list, and may estimate a maximum value among the values of the cost function written in the list as a maximum value of the score function for the corresponding scheduling policy.

The method may further include a scheduler learning module configured to learn the scheduling policy of the job scheduler using a predetermined artificial neural network model.

The scheduler learning module may include a scheduler learning unit configured to generate learning data based on job-related log information provided in the computing environment to be scheduled and learns the scheduling policy by inputting the learning data into the artificial neural network model; and a performance evaluation unit configured to, when performance of the job scheduler according to the learned scheduling policy is equal to or greater than performance of the job scheduler according to the previous scheduling policy, update the learned scheduling policy to the scheduling policy of the job scheduler.

The method may further include a resource expansion amount prediction module configured to predict the amount of resource to be expanded of the computing environment to be scheduled.

The resource expansion amount prediction module may be configured to calculate a value of a score function for a scheduling policy using a resource capacity of a set of predetermined resource capacities, to calculate a predetermined reference condition value in the computing environment to be scheduled, to match the corresponding resource capacity with a value of a score function corresponding to the resource capacity and to write the matching values in a list when the predetermined reference condition value is equal to or lower than a predetermined threshold value, and to extract a resource capacity at which the value of the score function becomes a maximum value from the list as an optimal value of the resource capacity to be expanded.

According to an example embodiment of the present disclosure, a system for monitoring a job scheduler includes a job scheduler configured to schedule jobs in a computing environment to be scheduled; and an apparatus for monitoring a job scheduler configured to check whether it is necessary to determine whether to expand a resource of a computing environment to be scheduled when a job is performed by scheduling by a job scheduler, to calculate a value of a score function for a scheduling policy currently executing and a maximum value of a predetermined score function when it is necessary to determine whether to expand a resource of the computing environment to be scheduled, and to determine to expand a resource of the computing environment to be scheduled based on the value of the score function and the maximum value of the predetermined score function.

BRIEF DESCRIPTION OF THE DRAWINGS

The above and other aspects, features, and advantages of the present disclosure will be more clearly understood from the following detailed description, taken in combination with the accompanying drawings, in which.

DETAILED DESCRIPTION

Hereinafter, embodiments of the present disclosure will be described as below with reference to the accompanying drawings. The detailed description as below may be provided to provide a comprehensive understanding of the methods, apparatus, and/or system described herein. However, this is merely an example, and the present disclosure is not limited thereto.

In describing the example embodiments of the present disclosure, when it is determined that the detailed description of a known technique related to the present disclosure may unnecessarily obscure the gist of the present disclosure, the detailed description thereof will not be provided. Also, the terms to be described later are defined in consideration of functions in the present disclosure, which may vary according to intentions or customs of a user and an operator. Therefore, the definition should be made based on the descriptions throughout this specification. The terms used in the detailed description are to describe example embodiments of the present disclosure, and the present disclosure is not limited thereto. Unless otherwise indicated, a singular form includes a plural form in the present specification. The word "include" or "comprise" and variations such as "comprises" or "comprising," will be understood to imply the inclusion of stated constituents, operations, operations and/ or elements but not the exclusion of any other constituents, operations, operations and/or elements.

In the following description, the term "transmit," "communicate," "send," "receive" and other similar terms in relation to transmission and reception of a signal or information may include direct transmission of a signal or information and also transmission of a signal or information through another component. In particular, "transmitting" or "transmitting" a signal or information to a component may indicate the final destination of the signal or information and does not imply a direct destination, which may also apply to "reception" of signals or information. Also, in this specification, the notion that two or more pieces of data or information are "related" may indicate that, when one pieces of data (or information) is obtained, at least a portion of other piece of data (or information) may be obtained based the obtained data.

Figure 1:
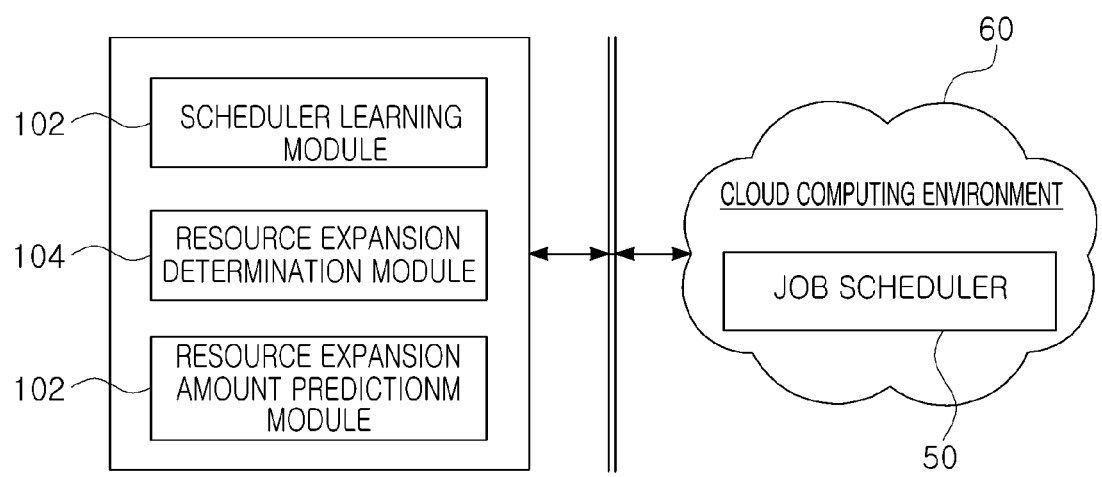
FIG. 1 is a diagram illustrating a configuration of an apparatus for monitoring a job scheduler according to an example embodiment of the present disclosure.

FIG. 1 is a diagram illustrating a configuration of an apparatus for monitoring a job scheduler according to an example embodiment.

Referring to FIG. 1, the apparatus 100 for monitoring a job scheduler may include a scheduler learning module 102, a resource expansion determination module 104, and a resource expansion amount prediction module 106. The apparatus 100 for monitoring a job scheduler may be communicatively connected to the job scheduler 50 through a communications network.

In an example embodiment, the scheduler learning module 102, the resource expansion determination module 104, and the resource expansion amount prediction module 106 may be implemented using one or more physically separated devices, or alternatively, one or more processors or a combination of one or more processors and software, and differently from the illustrated example, specific operations thereof may not be clearly distinct from each other.

In an example embodiment, the job scheduler 50 may operate in a cloud computing environment 60. In this case, the apparatus 100 for monitoring a job scheduler may operate in another computing environment communicatively connected to the cloud computing environment 60. The computing environment in which the apparatus 100 for monitoring a job scheduler operates and the computing environment in which the job scheduler 50 operates may be different, but an example embodiment thereof is not limited thereto.

Figure 2:
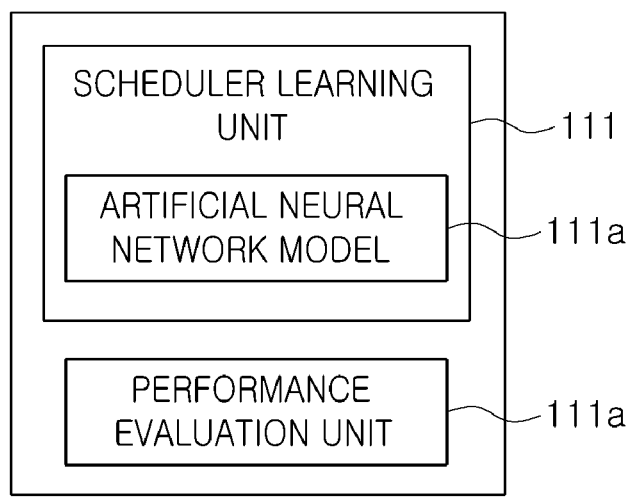
FIG. 2 is a block diagram illustrating a configuration of a scheduler learning module according to an example embodiment of the present disclosure.

The scheduler learning module 102 may learn a scheduling policy of the job scheduler 50 based on artificial intelligence. Also, the scheduler learning module 102 may evaluate performance of the job scheduler 50 which have leant the scheduling policy. FIG. 2 is a block diagram illustrating a configuration of a scheduler learning module 102 according to an example embodiment. Referring to FIG. 2, the scheduler learning module 102 may include a scheduler learning unit 111 and a performance evaluation unit 113.

The scheduler learning unit 111 may learn a scheduling policy of the job scheduler 50 based on artificial intelligence. Specifically, the scheduler learning unit 111 may generate learning data for learning the job scheduler 50 based on job-related log information provided by the cloud computing environment 60. In an example embodiment, the job-related log information may include a type of job, a start time and an end time of an application, a requested resource, a duration time of a job, and the like.

The scheduler learning unit 111 may include an artificial neural network model 111a for learning a scheduling policy of the job scheduler 50. The scheduler learning unit 111 may learn a scheduling policy of the job scheduler 50 by inputting learning data into the artificial neural network model 111a.

The performance evaluation unit 113 may evaluate performance of the job scheduler 50 having learnt the scheduling policy. In this case, the performance evaluation unit 113 may perform a simulation to test performance of the job scheduler 50. When performance of the job scheduler 50 which has performed scheduling according to the learned scheduling policy is equal to or greater than performance of the job scheduler 50 which has performed scheduling according to the previous scheduling policy, the performance evaluation unit 113 may update the scheduling policy of the scheduler 50 with the learned scheduling policy.

Here, when performance of the job scheduler 50 which has performed scheduling by the learned scheduling policy is less than performance of the job scheduler 50 which has performed scheduling by the previous scheduling policy, the performance evaluation unit 113 may transfer a notification to the scheduler learning unit 111 such that the scheduler learning unit 111 may learn the scheduling policy again.

The resource expansion determination module 104 may determine whether it is necessary to expand the resource in a computing environment targeted for scheduling when a job is performed by scheduling by the job scheduler 50. In this case, the job scheduler 50 may schedule a job using one of the plurality of pre-learned scheduling policies.

Figure 3:
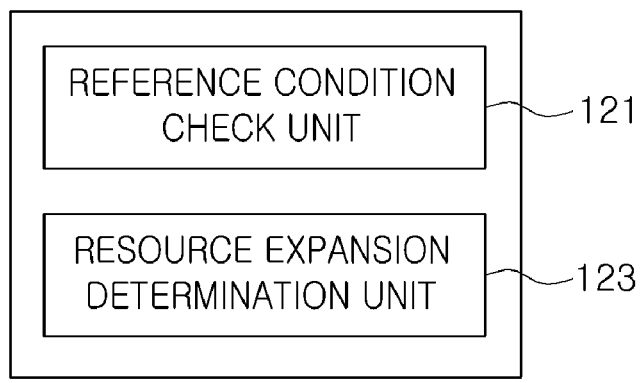
FIG. 3 is a block diagram illustrating a configuration of a resource expansion determination module according to an example embodiment of the present disclosure.

FIG. 3 is a block diagram illustrating a configuration of a resource expansion determination module according to an example embodiment. Referring to FIG. 3, the resource expansion determination module 104 may include a reference condition check unit 121 and a resource expansion determination unit 123.

The reference condition check unit 121 may check whether a predetermined reference condition value of the computing environment targeted for scheduling (e.g., which is a cloud computing environment 60, and hereinafter, may be referred to as a "computing environment to be scheduled") of the job scheduler 50 exceeds a predetermined threshold value. The reference condition value may be a value calculated to determine whether to expand the resource of the computing environment to be scheduled.

In an example embodiment, as a predetermined reference condition value, an average slowdown compared to execution time of a job, an average waiting with respect to a waiting job and an executing job, a GPU-related usage (e.g., GPU usage for each machine, total GPU usage, GPU memory usage, and the like), a CPU and RAM usage for an entire system, and workload of a waiting job compared to a residual resource may be used. Threshold values may be set for each of these predetermined reference condition values.

When a plurality of predetermined reference condition values are present, and when one of a plurality of predetermined reference condition values is satisfied or two or more conditions are simultaneously satisfied, the reference condition check unit 121 may determine that it is necessary to determine whether to expand the resource. For example, when the average slowdown exceeds a predetermined threshold value as compared to the execution time of a job, the reference condition check unit 121 may determine that it is necessary to determine whether to expand the resource.

The resource expansion determination unit 123 may check whether it is possible to improve performance of the job scheduler 50 for a workload generated in a computing environment to be scheduled. When it is possible to improve performance of the job scheduler 50 for a workload generated in the computing environment to be scheduled, the resource expansion determining unit 123 may change the policy of the job scheduler 50 for the corresponding workload.

When it is impossible to improve performance of the job scheduler 50 for the workload generated in the computing environment to be scheduled, the resource expansion determination unit 123 may determine to increase the resource of the computing environment to be scheduled.

Specifically, the resource expansion determination unit 123 may obtain a score function indicating how well the scheduling job scheduler 50 performs scheduling for the provided workload. The score function may depend on resource capacity, a cluster status, a workload, and a scheduling policy.

Here, the resource capacity may be a resource capacity of a computing environment to be scheduled, and may include CPU performance, GPU performance, and available memory. The cluster status may refer to a use state of clusters in the computing environment to be scheduled (e.g., how many clusters are in use in which state). The workload data may refer to workload data of a job assigned to the job scheduler 50. The scheduling policy may refer to a scheduling policy used for scheduling a corresponding job among pre-stored scheduling policies. Also, the score function ($\mathcal{L}$) may be represented by Equation 1 below:

$$\mathcal{L}_{(\pi,c,d,s)} \quad \text{(Equation 1)}$$

π: scheduling policy
c: resource capacity
d: workload data
s: cluster status

The higher the score function ($\mathcal{L}$), the better, but since the total amount of resource of the computing environment to be scheduled is limited, the values of the score function ($\mathcal{L}$) which may be obtained while changing the scheduling policy for a specific workload also may have a maximum value. In this case, the maximum value of the score function ($\mathcal{L}$) may be represented by Equation 2 below:

$$\mathcal{L}_{max} = \max_{\pi} \mathcal{L}(\pi, c, d, s) \quad \text{(Equation 2)}$$

Meanwhile, when the value of the score function ($\mathcal{L}_\tau$) for the currently executing scheduling policy (τ) is approximate to the maximum value ($\mathcal{L}_{max}$) of the score function (that is, when a difference between $\mathcal{L}_\tau$ and $\mathcal{L}_{max}$ is less than a predetermined threshold), even though the scheduling policy is changed, it may be difficult to expect improvement of performance of the job scheduler 50, such that the resource expansion determining unit 123 may determine that it is necessary to expand the resource of the computing environment to be scheduled.

Here, since it is practically difficult to know the maximum value of the score function for all scheduling policies, the maximum value of the score function for a scheduling policy may be estimated using a cost function in the process of learning the job scheduler 50.

In an example embodiment, the resource expansion determination unit 123 may learn a new scheduling policy ($\tau_{new}$) of the job scheduler 50 based on a resource capacity c, the cluster status s, and the workload data d, and may write values of the cost function calculated in the learning process in the list.

Here, the resource expansion determination unit 123 may estimate the maximum value among values of the cost function written in the list as the maximum value of the score function for the corresponding scheduling policy. In this case, the maximum value ($\mathcal{L}_{max}$) of the score function for the corresponding scheduling policy may be represented by Equation 3 below:

$$\mathcal{L}_{max} = \max_{r \in L} r \quad \text{(Equation 3)}$$

L: list of cost function
r: value of cost function

The resource expansion determination unit 123 may calculate the value of the score function ($\mathcal{L}_\tau = \mathcal{L}(\tau, c, d, s)$) for the currently executing scheduling policy (τ), and when a difference between the value of the score function ($\mathcal{L}_\tau$) for the currently executing scheduling policy (τ) and the maximum value ($\mathcal{L}_{max}$) of the score function for the corresponding scheduling policy is lower than a predetermined threshold value, the resource expansion determination unit 123 may determine that it is necessary to expand the resource of the computing environment to be scheduled. In this case, the resource expansion determination unit 123 may determine whether the difference is lower than the predetermined threshold value through Equation 4 below:

$$\left|\frac{\mathcal{L}_\tau - \mathcal{L}_{max}}{\mathcal{L}_{max}}\right| < \varepsilon \quad \text{(Equation 4)}$$

ε: predetermined threshold value (ε>0)

Meanwhile, here, it is determined whether to expand the resource for a specific workload data d, and since the workload data may continuously change in the actual computing environment to be scheduled, a method of using the distribution of probability of the workload data may be used.

Specifically, the resource expansion determination unit 123 may calculate distribution of probability of workload data from pre-stored workload data. Here, the pre-stored workload data may be workload data on which the job scheduler 50 performed scheduling in the past. The resource expansion determination unit 123 may generate arbitrary workload data $d_k$ to follow the calculated distribution of probability.

The resource expansion determination unit 123 may learn a new scheduling policy ($\tau_k$) of the job scheduler 50 based on the resource capacity c, the cluster status s, and the workload data $d_k$, and may write the values of the cost function calculated in the learning process in the list. Here, the resource expansion determination unit 123 may estimate the maximum value among values of the cost function written in the list as the maximum value of the score function for the corresponding scheduling policy.

The resource expansion determination unit 123 may calculate the value of the score function ($\mathcal{L}_\tau = \mathcal{L}(\tau, c, d, s)$) for the currently executing scheduling policy (τ), and when a difference between the value of the score function ($\mathcal{L}_\tau$) for the currently executing scheduling policy (τ) and the maximum value ($\mathcal{L}_{max}$) of the score function the corresponding scheduling policy is lower than a predetermined threshold value, the resource expansion determination unit 123 may determine that it is necessary to expand the resource of the computing environment to be scheduled.

When it is determined that it is necessary to expand the resource of the computing environment to be scheduled by the resource expansion determination module 104, the resource expansion amount prediction module 106 may predict to what extent the resource should be expanded.

Specifically, when the resource expansion amount prediction module 106 is provided with the cluster status s, the workload data d, and a current scheduling policy (π), the resource expansion amount prediction module 106 may calculate a value of the score function ($\mathcal{L}_c = \mathcal{L}(\pi, c, d, s)$) for the corresponding scheduling policy using a resource capacity c of a set of predetermined resource capacities. Also, the resource expansion amount prediction module 106 may determine whether a predetermined reference condition value of the computing environment to be scheduled is equal to or lower than a predetermined threshold value.

Here, the reference condition value may be the same as the reference condition value used to determine whether to expand the resource. However, here, it is determined that the resource of the computing environment to be scheduled is not insufficient by determining whether the reference condition value is equal to or lower than a predetermined threshold value. For example, the resource expansion amount prediction module 106 may check whether an average slowdown of a job is equal to or lower than a predetermined threshold value as compared to the execution time.

When the reference condition value is equal to or less than a predetermined threshold, the resource expansion amount prediction module 106 may match the resource capacity c used for scheduling to the value of the score function ($\mathcal{L}_c = \mathcal{L}(\pi, c, d, s)$) for the scheduling policy calculated using the resource capacity c, and may write the matching values.

The resource expansion amount prediction module 106 may repeat the process for each resource capacity included in a predetermined set of resource capacities, may match the resource capacity in which the reference condition value is equal to or lower than the predetermined threshold value to a value of the score function corresponding thereto and may write the matching values in the list.

The resource extension amount prediction module 106 may extract the resource capacity in which the value of the score function ($\mathcal{L}_c$) from the list becomes the maximum as an optimal value of the resource capacity to be expanded in the computing environment to be scheduled. That is, the resource expansion amount prediction module 106 may extract the optimal value $c_{max}$ of the resource capacity to be expanded in the computing environment to be scheduled through Equation 5 below:

$$c_{max} = \underset{(c, \mathcal{L}_c) \in L}{\operatorname{argmax}} \mathcal{L}_c \quad \text{(Equation 5)}$$

L: list in which the resource capacity and the value of the score function match.

According to the example embodiment, by evaluating performance of the job scheduler according to the learned scheduling policy and determining whether to update the job scheduler, performance of the job scheduler may be monitored and performance of the job scheduler may improve. Also, by determining whether it is necessary to expand the resource in the computing environment to be scheduled and predicting how much the resource expansion should be when it is necessary to expand the resource, performance of the job scheduler and overall performance of the computing environment to be scheduled may improve.

In example embodiments, a module may refer to a functional and structural combination of hardware for performing the technical idea of the present disclosure and software for driving the hardware. For example, the "module" may refer to a logical unit of a predetermined code and a hardware resource for executing the predetermined code, and may not necessarily refer to a physically connected code or a single type of hardware.

Figure 4:
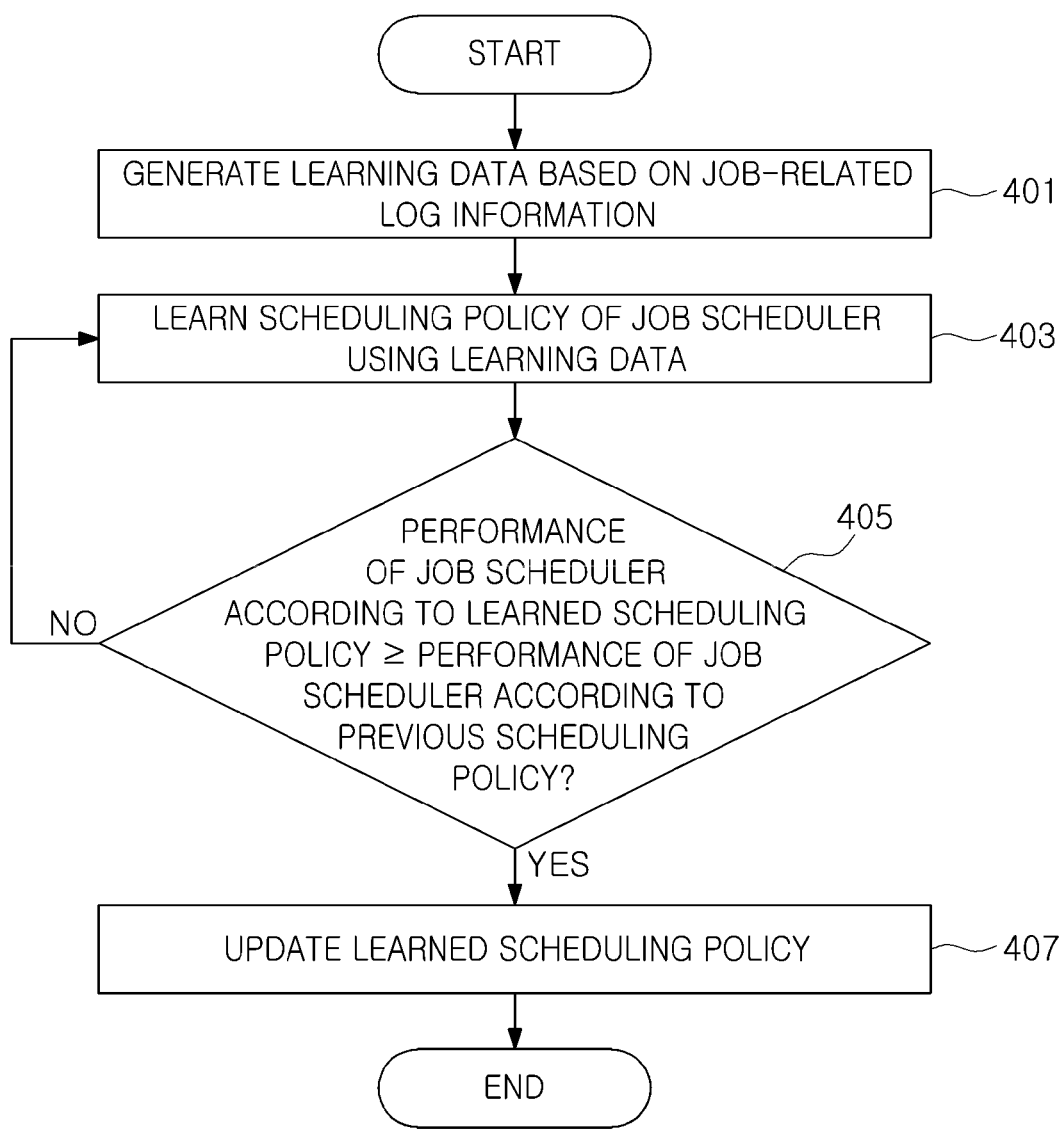
FIG. 4 is a flowchart illustrating a method of learning a job scheduler according to an example embodiment of the present disclosure.

FIG. 4 is a flowchart illustrating a method of learning a job scheduler according to an example embodiment, illustrating a method of learning an artificial intelligence-based job scheduler 50. The method illustrated in FIG. 4 may be performed, for example, by the apparatus 100 for monitoring a job scheduler in FIG. 1.

Referring to FIG. 4, the apparatus 100 for monitoring a job scheduler may generate learning data for learning the job scheduler 50 based on job-related log information provided by a computing environment to be scheduled (401).

Thereafter, the apparatus 100 for monitoring a job scheduler may learn the scheduling policy of the job scheduler 50 by inputting the learning data into the artificial neural network model 111a (403).

Thereafter, the apparatus 100 for monitoring a job scheduler may check whether performance of the job scheduler 50 according to the learned scheduling policy is equal to or greater than performance of the job scheduler 50 according to the previous scheduling policy (405).

In operation 405, when performance of the job scheduler 50 by the learned scheduling policy is equal to or greater than performance of the job scheduler 50 by the previous scheduling policy, the apparatus 100 for monitoring a job scheduler may update the scheduling policy of the job scheduler 50 with the learned scheduling policy (407).

In operation 405, when performance of the job scheduler 50 by the learned scheduling policy is less than performance of the job scheduler 50 by the previous scheduling policy, the apparatus 100 for monitoring a job scheduler may return to operation 403 and may re-learn the scheduling policy.

Meanwhile, in the flowchart illustrated in FIG. 4, the method has been described by dividing the method into a plurality of operations, but at least a portion of the operations may be performed in a different order, may be performed in combination with the other operations, may not be performed, may be performed by being divided into specific operations, or may further include one or more operations not illustrated.

Figure 5:
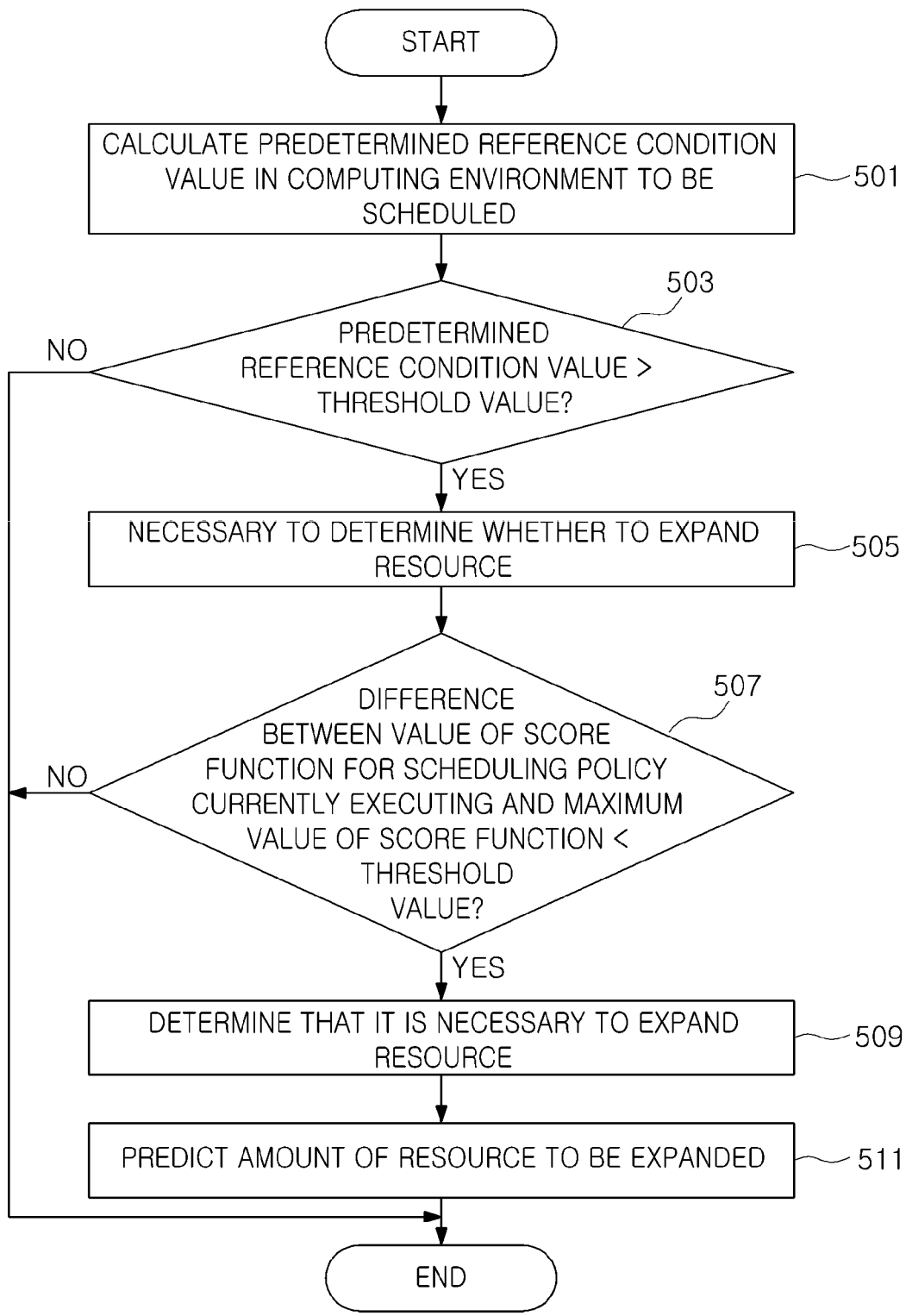
FIG. 5 is a flowchart illustrating a method of determining whether to expand a resource of a computing environment to be scheduled.

FIG. 5 is a flowchart illustrating a method of determining whether to expand a resource of a computing environment to be scheduled, illustrating a method of determining whether to expand the resource of the computing environment to be scheduled. The method illustrated in FIG. 5 may be performed, for example, by the apparatus 100 for monitoring a job scheduler in FIG. 1.

Referring to FIG. 5, the apparatus 100 for monitoring a job scheduler may calculate a predetermined reference condition value in a computing environment to be scheduled when a job is performed by scheduling by the job scheduler 50 (501).

Here, as the predetermined reference condition value, an average slowdown compared to execution time of a job, an average waiting with respect to a waiting job and an executing job, a GPU-related usage (e.g., GPU usage for each machine, total GPU usage, GPU memory usage, and the like), a CPU and RAM usage for an entire system, and workload of a waiting job compared to a residual resource may be used. Since the reference condition value is a known technique, a specific method of calculating the elements will not be provided.

Thereafter, the apparatus 100 for monitoring a job scheduler may check whether a predetermined reference condition value exceeds a predetermined threshold value (503).

In operation 503, when the predetermined reference condition value exceeds the predetermined threshold value, the apparatus 100 for monitoring a job scheduler may determine that it is necessary to determine whether to expand the resource of the computing environment to be scheduled (505)

Thereafter, the apparatus 100 for monitoring a job scheduler may check whether a difference between the value of the score function for the scheduling policy currently executing and the maximum value of the predetermined score function is lower than a predetermined threshold value (507).

In operation 507, when the difference between the value of the score function for the executing scheduling policy and the maximum value of the predetermined score function is lower than a predetermined threshold value, the apparatus 100 for monitoring a job scheduler may determine that it is necessary to expand the resource of the computing environment to be scheduled (509).

Thereafter, the apparatus 100 for monitoring a job scheduler may predict the amount of resources to be expanded of the computing environment to be scheduled (511), which will be described in greater detail with reference to FIG. 6.

Meanwhile, in operation 503, when the predetermined reference condition value is equal to or lower than the predetermined threshold value, the apparatus 100 for monitoring a job scheduler may not expand the resource of the computing environment to be scheduled, and for improvement of performance of the job scheduler 50, the apparatus 100 may change the scheduling policy of the job scheduler 50.

Also, in operation 507, when the difference between the value of the score function for the executing scheduling policy and the maximum value of the predetermined score function is equal to or greater than a predetermined threshold value, the apparatus 100 for monitoring a job scheduler may not expand the resource of the computing environment to be scheduled and may change the scheduling policy of the job scheduler 50 for improvement of performance of the job scheduler 50.

In the flowchart illustrated in FIG. 5, the method is described by dividing the method into a plurality of operations, but at least a portion of the operations may be performed in a different order, may be performed in combination with the other operations, may not be performed, may be performed by being divided into specific operations, or may further include one or more operations not illustrated.

Figure 6:
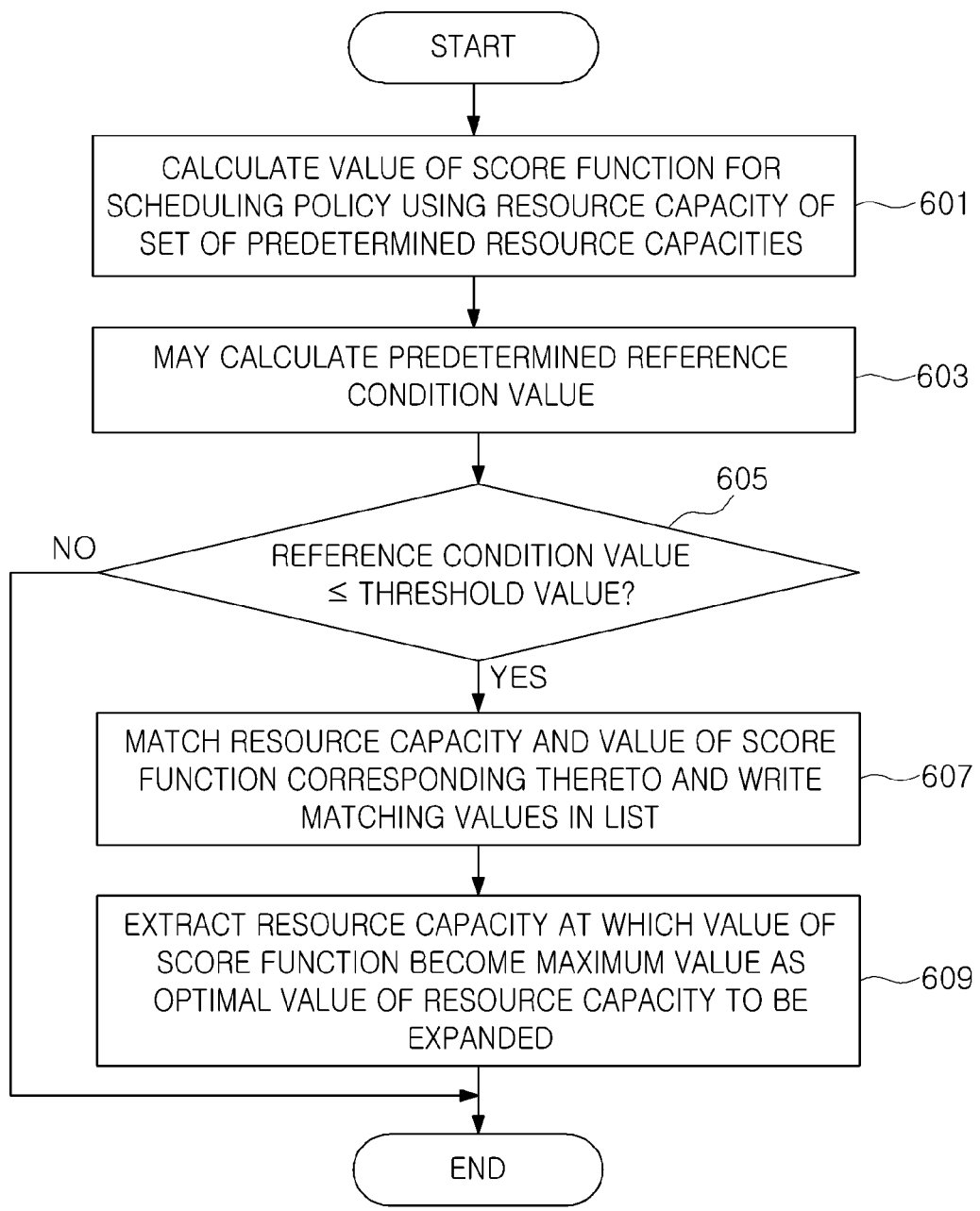
FIG. 6 is a flowchart illustrating a method of predicting the amount of resources to be expanded in a computing environment to be scheduled.

FIG. 6 is a flowchart illustrating a method of predicting the amount of resources to be expanded in a computing environment to be scheduled, illustrating a method of predicting the amount of resource to be expanded in the computing environment to be scheduled. The method illustrated in FIG. 6 may be performed, for example, by the apparatus 100 for monitoring a job scheduler in FIG. 1.

Referring to FIG. 6, the apparatus 100 for monitoring a job scheduler may calculate a value of a score function for a scheduling policy using a resource capacity of a set of predetermined resource capacities (601).

Thereafter, the apparatus 100 for monitoring a job scheduler may calculate a predetermined reference condition value in the computing environment to be scheduled (603).

Thereafter, the apparatus 100 for monitoring a job scheduler may check whether a predetermined reference condition value is equal to or lower than a predetermined threshold value (605).

In operation 605, when the predetermined reference condition value is equal to or lower than the predetermined threshold value, the apparatus 100 for monitoring a job scheduler may match the resource capacity used for scheduling and a value of the score function corresponding thereto and may write the matching values in the list (607).

The apparatus 100 for monitoring a job scheduler may repeats the operations from operations 601 to 607 for each resource capacity included in a predetermined set of resource capacities, and may match the resource capacity in which the reference condition value is equal to or lower than the predetermined threshold value and the score function corresponding thereto and may write the matching values in the list.

Thereafter, the apparatus 100 for monitoring a job scheduler may extract the resource capacity in which the value of the score function becomes the maximum value as an optimal value of the resource capacity to be expanded in the computing environment to be scheduled (609).

In the flowchart illustrated in FIG. 6, the method is described by dividing the method into a plurality of operations, but at least a portion of the operations may be performed in a different order, may be performed in combination with the other operations, may not be performed, may be performed by being divided into specific operations, or may further include one or more operations not illustrated.

Figure 7:
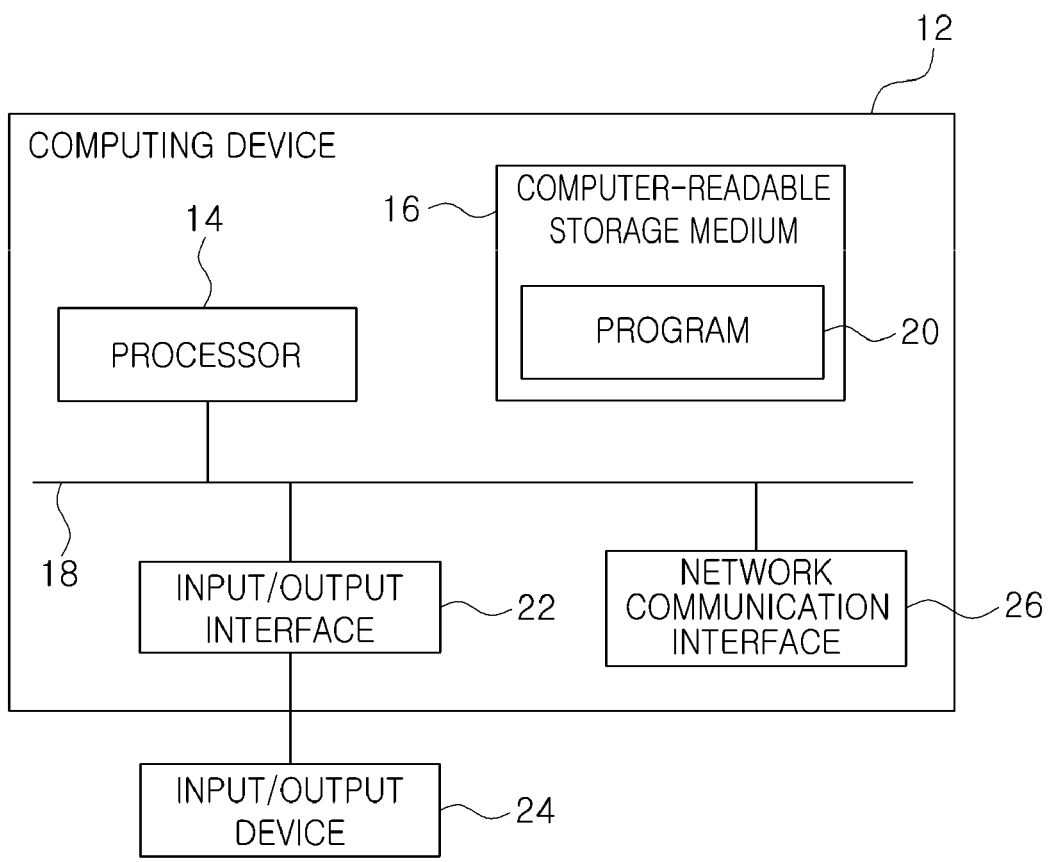
FIG. 7 is a block diagram illustrating a computing environment including a computing device used in example embodiments.

FIG. 7 is a block diagram illustrating a computing environment 10 including a computing device used in example embodiments. In the illustrated example embodiment, each component may have different functions and capabilities other than those described below, and may include additional components in addition to those described below.

The illustrated computing environment 10 may include a computing device 12. In an example embodiment, the computing device 12 may be implemented as the apparatus 100 for monitoring a job scheduler.

The computing device 12 may include at least one processor 14, a computer-readable storage medium 16, and a communication bus 18. The processor 14 may allow the computing device 12 to operate in accordance with the example embodiments discussed above. For example, the processor 14 may execute one or more programs stored in a computer-readable storage medium 16. The one or more programs may include one or more computer-executable instructions, and when the computer-executable instructions are executed by the processor 14, the computing device 12 may perform operations in accordance with the example embodiments described above.

The computer-readable storage medium 16 may be configured to store computer-executable instructions or program code, program data, and/or other suitable form of information. The program 20 stored in the computer-readable storage medium 16 may include a set of instructions executable by the processor 14. In an example embodiment, the computer-readable storage medium 16 may be implemented as a memory (a volatile memory such as a random access memory, a non-volatile memory, or a suitable combination thereof), one or more magnetic disk storage devices, optical disk storage devices, flash memory devices, other forms of storage media which may be accessed by the computing device 12 and may store desired information, or a suitable combination thereof.

The communication bus 18 may interconnect various other components of computing device 12, including the processor 14 and the computer-readable storage medium 16.

The computing device 12 may also include one or more input/output interfaces 22 and one or more network communication interfaces 26 which may provide interfaces for one or more input/output devices 24. The input/output interface 22 and the network communication interface 26 may be connected to the communication bus 18. The input/output device 24 may be connected to the other components of the computing device 12 via input/output interface 22. Examples of the input/output device 24 may include a pointing device (such as a mouse or trackpad), a keyboard, a touch input device (such as a touchpad or touchscreen), a voice or sound input device, input devices such as various types of sensor devices, and/or imaging devices, and/or output devices such as a display device, a printer, a speaker and/or network card. The example input/output device 24 may be included in the computing device 12 as a component included in the computing device 12, or may be connected to the computing device 12 as a device distinct from the computing device 12.

According to the aforementioned example embodiments, by evaluating performance of the job scheduler according to the learned scheduling policy and determining whether to update the job scheduler, performance of the job scheduler may be monitored such that performance of the job scheduler may improve. Also, by determining whether it is necessary to expand the resource in the computing environment to be scheduled and predicting how much the expansion of the resource should be when it is necessary to expand the resource, performance of the job scheduler and overall performance of the computing environment to be scheduled may improve.

While the example embodiments have been illustrated and described above, it will be configured as apparent to those skilled in the art that modifications and variations could be made without departing from the scope of the present disclosure as defined by the appended claims.

What is claimed is:

1. A method for monitoring a job scheduler, the method performed on a computing device including one or more processors and a memory storing one or more programs executed by the one or more processors, the method comprising:
   checking whether it is necessary to determine whether to expand a resource of a computing environment to be scheduled when a job is performed by scheduling by a job scheduler;
   calculating a value of a score function for a scheduling policy currently executing and a maximum value of a predetermined score function, when it is necessary to determine whether to expand the resource of the computing environment to be scheduled;
   determining to expand the resource of the computing environment to be scheduled, based on the value of the score function and the maximum value of the predetermined score function; and
   learning the scheduling policy of the job scheduler using a predetermined artificial neural network model,
   wherein the learning of the scheduling policy comprises:
   generating learning data based on job-related log information provided in the computing environment to be scheduled;
   learning the scheduling policy by inputting the learning data into the artificial neural network model;
   checking whether performance of the job scheduler according to the learned scheduling policy is equal to or greater than performance of the job scheduler according to a previous scheduling policy; and
   updating the learned scheduling policy to the scheduling policy of the job scheduler when the performance of the job scheduler according to the learned scheduling policy is equal to or greater than the performance of the job scheduler according to the previous scheduling policy.

2. The method of claim 1, wherein the checking comprises:
   calculating a predetermined reference condition value in the computing environment to be scheduled;
   checking whether the predetermined reference condition value exceeds a predetermined threshold value; and
   determining that it is necessary to determine whether to expand the resource of the computing environment to be scheduled, when the predetermined reference condition value exceeds the predetermined threshold value.

3. The method of claim 1, wherein the determining to expand the resource comprises:
calculating a difference between the value of the score function and the maximum value of the predetermined score function;
checking whether the difference between the value of the score function and the maximum value of the predetermined score function is lower than a predetermined threshold value; and
determining that it is necessary to expand the resource of the computing environment to be scheduled when the difference between the value of the score function and the maximum value of the predetermined score function is lower than the predetermined threshold value.

4. The method of claim 3, further comprising:
changing the scheduling policy of the job scheduler when the difference between the value of the score function and the maximum value of the predetermined score function is equal to or higher than the predetermined threshold value.

5. The method of claim 1, wherein the calculating of the maximum value of the score function comprises:
learning a new scheduling policy of the job scheduler;
writing in a list each of values of a cost function calculated in the learning; and
estimating a maximum value among the values of the cost function written in the list as the maximum value of the score function for the new scheduling policy.

6. The method of claim 1, wherein the calculating of the maximum value of the score function comprises:
calculating distribution of probability of pre-stored workload data;
generating arbitrary workload data to follow the calculated distribution of probability; learning a new scheduling policy of the job scheduler based on the generated arbitrary workload data;
writing in a list each of values of a cost function calculated in the learning; and
estimating a maximum value among the values of the cost function written in the list as the maximum value of the score function for the new scheduling policy.

7. The method of claim 1, further comprising:
predicting an amount of the resource to be expanded of the computing environment to be scheduled.

8. The method of claim 7, wherein the predicting of the amount of the resource to be expanded comprises:
calculating the value of the score function for the scheduling policy using a resource capacity among a set of predetermined resource capacities;
calculating a predetermined reference condition value in the computing environment to be scheduled;
checking whether the predetermined reference condition value is equal to or lower than a predetermined threshold value;
matching the resource capacity with the value of the score function corresponding to the resource capacity;
writing the matching value in a list, when the predetermined reference condition value is equal to or lower than the predetermined threshold value; and
extracting a resource capacity at which the value of the score function becomes a maximum value from the list as an optimal value of the resource capacity to be expanded.

9. An apparatus for monitoring a job scheduler, the apparatus comprising:

a processor;
a memory storing one or more programs configured to be executed by the processor; and
resource expansion determination module for which the one or more programs include instructions,
wherein the resource expansion determination module comprising:
a reference condition checking unit executed by the processor to check whether it is necessary to determine whether to expand a resource of a computing environment to be scheduled when a job is performed by scheduling by a job scheduler; and
a resource expansion determination unit executed by the processor to, when it is necessary to determine whether to expand the resource of the computing environment to be scheduled:
calculate a value of a score function for a scheduling policy currently executing and a maximum value of a predetermined score function, and to determine to expand the resource of the computing environment to be scheduled based on the value of the score function and the maximum value of the predetermined score function, and
learn the scheduling policy of the job scheduler using a predetermined artificial neural network model,
wherein learning of the scheduling policy comprises:
generating learning data based on job-related log information provided in the computing environment to be scheduled;
learning the scheduling policy by inputting the learning data into the artificial neural network model;
checking whether performance of the job scheduler according to the learned scheduling policy is equal to or greater than performance of the job scheduler according to a previous scheduling policy; and
updating the learned scheduling policy to the scheduling policy of the job scheduler when the performance of the job scheduler according to the learned scheduling policy is equal to or greater than the performance of the job scheduler according to the previous scheduling policy.

10. The apparatus of claim 9, wherein the reference condition checking unit is executed by the processor to calculate a predetermined reference condition value in the computing environment to be scheduled, and when the predetermined reference condition value exceeds a predetermined threshold value, the reference condition checking unit determines that it is necessary to determine whether to expand the resource of the computing environment to be scheduled.

11. The apparatus of claim 9, wherein the resource expansion determination unit is executed by the processor to calculate a difference between the value of the score function and the maximum value of the predetermined score function;
when the difference between the value of the score function and the maximum value of the predetermined score function is lower than a predetermined threshold value, the resource expansion determination unit is executed by the processor to determine that it is necessary to expand the resource of the computing environment to be scheduled; and
when the difference between the value of the score function and the maximum value of the predetermined score function is equal to or higher than the predetermined threshold value, the resource expansion determination unit is executed by the processor to change the scheduling policy of the job scheduler.

12. The apparatus of claim 9, wherein the resource expansion determination unit is executed by the processor to:
    learn a new scheduling policy of the job scheduler;
    write in a list each of values of a cost function calculated in the learning; and
    estimate a maximum value among the values of the cost function written in the list as the maximum value of the score function for the new scheduling policy.

13. The apparatus of claim 9, wherein the resource expansion determination unit is executed by the processor to:
    calculate distribution of probability of pre-stored workload data;
    generate arbitrary workload data to follow the calculated distribution of probability;
    learn a new scheduling policy of the job scheduler based on the generated arbitrary workload data;
    write in a list each of values of a cost function calculated in the learning; and
    estimate a maximum value among the values of the cost function written in the list as the maximum value of the score function for the new scheduling policy.

14. The apparatus of claim 9, further comprising:
    a resource expansion amount prediction module executed by the processor to predict an amount of the resource to be expanded of the computing environment to be scheduled.

15. The apparatus of claim 14, wherein the resource expansion amount prediction module is executed by the processor to:
    calculate the value of the score function for the scheduling policy using a resource capacity among a set of predetermined resource capacities;
    calculate a predetermined reference condition value in the computing environment to be scheduled;
    match the corresponding resource capacity with the value of the score function corresponding to the resource capacity;
    write matching values in a list when the predetermined reference condition value is equal to or lower than a predetermined threshold value; and
    extract a resource capacity at which the value of the score function becomes a maximum value from the list as an optimal value of the resource capacity to be expanded.

16. A system for monitoring a job scheduler, the system comprising:
    a job scheduler configured to schedule jobs in a computing environment to be scheduled; and
    an apparatus for monitoring the job scheduler, the apparatus comprising a processor and a memory storing one or more programs configured to be executed by the processor, which the one or more programs include instructions, the apparatus configured to:
    check whether it is necessary to determine whether to expand a resource of the computing environment to be scheduled when a job is performed by scheduling by a job scheduler;
    calculate a value of a score function for a scheduling policy currently executing and a maximum value of a predetermined score function when it is necessary to determine whether to expand the resource of the computing environment to be scheduled;
    determine to expand the resource of the computing environment to be scheduled based on the value of the score function and the maximum value of the predetermined score function; and
    learn the scheduling policy of the job scheduler using a predetermined artificial neural network model,
    wherein learning of the scheduling policy comprises:
    generating learning data based on job-related log information provided in the computing environment to be scheduled;
    learning the scheduling policy by inputting the learning data into the artificial neural network model;
    checking whether performance of the job scheduler according to the learned scheduling policy is equal to or greater than performance of the job scheduler according to a previous scheduling policy; and
    updating the learned scheduling policy to the scheduling policy of the job scheduler when the performance of the job scheduler according to the learned scheduling policy is equal to or greater than the performance of the job scheduler according to the previous scheduling policy.

* * * * *